INVENTOR
JOSEPH L. ZAGOTTA
ATTY

FIG. 4.
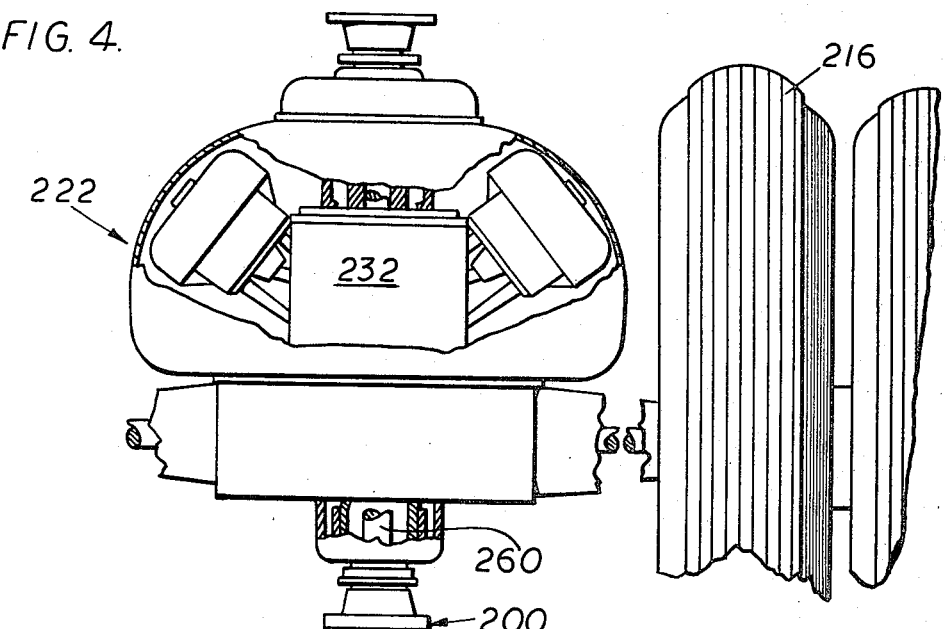
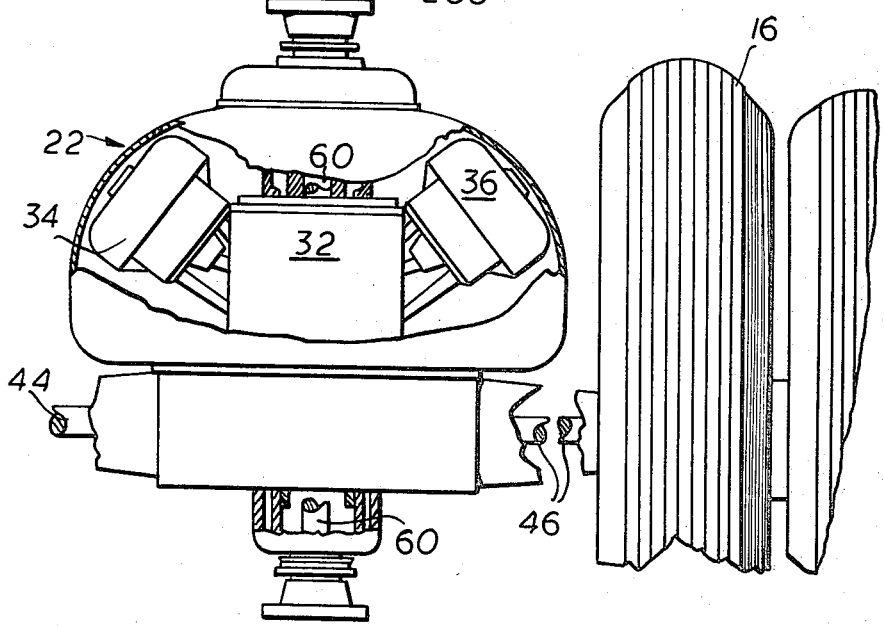
FIG. 5.
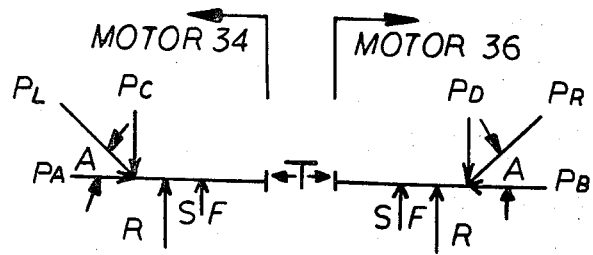
INVENTOR
JOSEPH L. ZAGOTTA
ATTY

United States Patent Office 3,419,096
Patented Dec. 31, 1968

3,419,096
LOW FRICTION HYDROSTATIC TRANSAXLE
Joseph L. Zagotta, Chicago, Ill., assignor to International Harvester Company, Chicago, Ill., a corporation of Delaware
Filed Oct. 2, 1967, Ser. No. 672,180
17 Claims. (Cl. 180—6.48)

ABSTRACT OF THE DISCLOSURE

A hydrostatic transaxle unit for use in a motor vehicle to replace a transmission and differential in the drive mechanism. The transaxle unit includes a variable displacement pump and a pair of hydrostatic axial piston type motor units for driving the vehicle axle drive shafts through countershaft gearing connected between the motor units and the axle drive shafts. In order to minimize friction losses, the various components have unique bearing mountings. The orientation of the hydrostatic motor parts are such to cause driven units to be acted upon by both radially and axially directed components of piston force. The radial components generate the desired torque, the axial component is an undesirable force that is normally supported through some bearing means by the housing thus generating a so-called friction horsepower. Here the motor units are mounted so their axial components counteract and are separated by a thrust bearing means to allow a differential speed, and the pump of the transaxle is positioned and constructed so that its drive shaft may be extended rearwardly for coupling to and driving a pair of tandem wheels through a second transaxle.

BACKGROUND OF THE INVENTION

This invention relates to a hydrostatic transaxle for use on automotive vehicles.

A principal object of the present invention is to provide a vehicle drive arrangement which replaces the normal transmission and the differential commonly associated with a vehicle drive.

Another object is to provide a vehicle drive arrangement utilizing a variable displacement fluid pump for driving hydrostatic motors which are independently drivingly connected to drive trains on opposite sides of a vehicle.

Another object is to provide a vehicle drive arrangement wherein two hydrostatic motors independently drive the two wheel assemblies of a rear axle through a countershaft gear set to allow the assembly to be compatible with the standard axle housing of many vehicles.

A further object is to provide a vehicle drive arrangement including a variable displacement pump, and two hydrostatic motors independently drivingly connected to two wheel assemblies of a vehicle rear axle through countershaft gearing wherein the majority of components are uniquely bearing supported to minimize frictional losses.

Another object is to provide in conjunction with two hydrostatic motors for driving wheel assemblies on opposite sides of a vehicle a means to absorb oppositely directed transverse thrust of the two motors and a bearing means to allow differential action between the motors.

The above and other objects and advantages of the invention will be more readily apparent when read in connection with the accompanying drawings in which:

FIGURE 4 is a plan view in section showing a tandem axle unit of a vehicle wherein hydrostatic motor units incorporating the principles of the invention are used to independently drive each of the wheel assemblies; and FIGURE 5 is a diagram illustrating forces produced in the transaxle unit.

Figure 1:
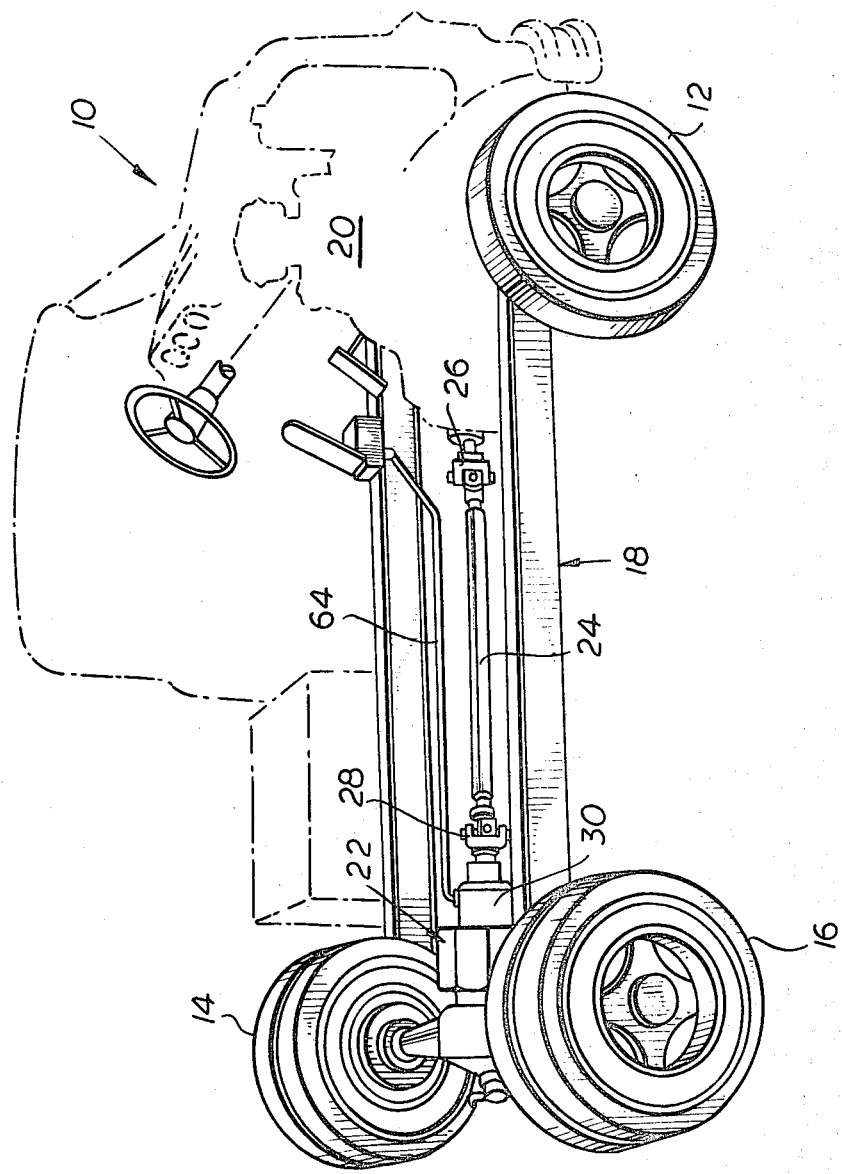
FIGURE 1 is a typical motor vehicle in which the hydrostatic transaxle unit herein disclosed may be used.
Figure 2:
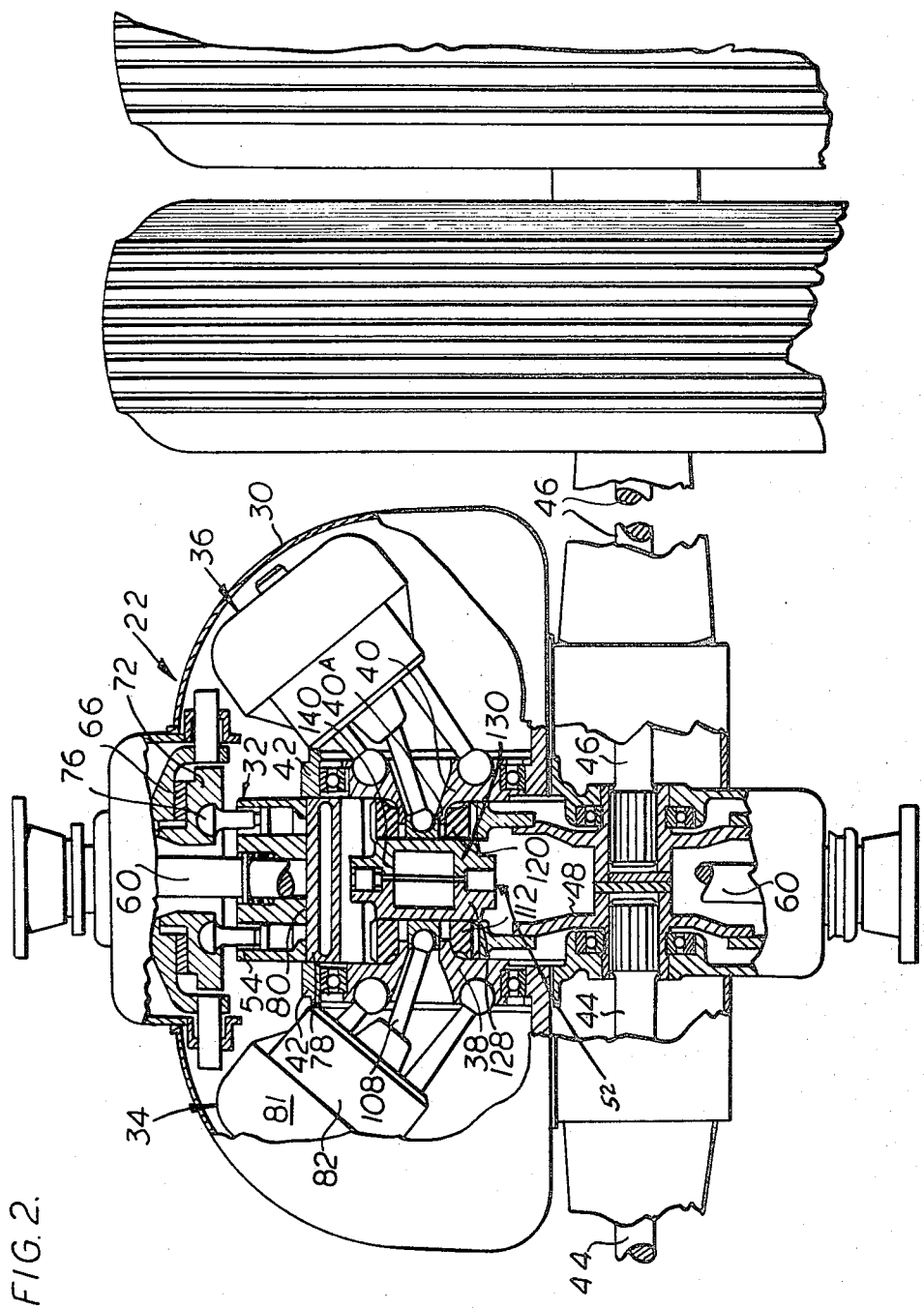
FIGURE 2 is a plan view in section showing a hydrostatic transaxle unit in relation to an axle drive shaft and a wheel assembly with which it is associated.

Referring now to the drawings wherein like reference characters designate similar parts there is shown in FIGURE 1, the general outline of a vehicle 10 in which the invention herein disclosed may be utilized. The vehicle 10 includes front steering wheels 12, rear driving wheel assemblies 14 and 16 supporting a chassis 18 which in turn supports an engine 20. A hydrostatic transaxle unit 22 for driving the wheel assemblies 14 and 16 is disposed between the wheels 14 and 16. The unit 22 takes its drive from the engine 20 through drive shaft 24 which is connected to the engine crankshaft (not shown) and the transaxle unit 22 by appropriate universal joint units 26 and 28, respectively.

The hydrostatic transaxle unit 22 includes a housing 30, a variable displacement pump 32, a pair of hydrostatic motors 34 and 36, force plates 38 and 40 connected to the motor units 34 and 36, a casing 42, part of housing 30 with which the pump 32 and motors 34 and 36 are operatively associated and in which the force plates, part of the hydrostatic motors, are rotatably mounted. The unit 22 also includes coaxially disposed axle drive shafts 44 and 46 connected respectively to the driving wheel assemblies 14 and 16 and countershaft gear sets 48 and 50 to transmit drive from the hydrostatic motor 34 to drive shaft 44 and from hydrostatic motor 36 to drive shaft 46, respectively. Thrust bearing means 52 is disposed between the hydrostatic motors 34 and 36. The orientation of the motors is such that their axial forces counteract each other and are located axially by bearing means 106 and 106A. Bearing means 52 allows differential speed between motors 34 and 36. The pump 32 as herein disclosed is mounted in the housing 30, but it should be understood that such a pump could be mounted on the engine 20 and equipped with flexible conduits to carry hydraulic fluid to the motors 34 and 36.

The pump 32 is a variable displacement pump preferably of the axial piston type. It includes a cylinder barrel 54 having formed therein, a plurality of longitudinally extending cylinders 56 for accommodating a plurality of pistons 58. A pump drive shaft 60 extends axially through the cylinder barrel 54 and the latter is secured to the shaft 60, such as by splining, to rotate therewith. The force plate 72 is driven and synchronized with the cylinder barrel with a conventional coupling (not shown). The pump drive shaft 60 has its forward end rotatably mounted in the forward end of housing 30 by suitable bearing means 62 and in the rear end of the housing 30 by similar bearing means (not shown). The pump drive shaft 60 is connected to the drive shaft 24 and universal joints 26 and 28. The pump drive shaft 60 extends in a plane lying above the axis of the axle drive shafts 44 and 46. Displacement of the pump 32 is controlled by conventional means energized through lines 64 (see FIGURE 1) connected to a hydraulic fluid source (not shown). The pump 32 also includes a non-rotatable frame 66 mounted for tilting movement within the housing 30 by means of servo mechanized driving trunnions 68 and 70. The frame 66 surrounds the pump drive shaft 60. The force plate 72 is rotatably mounted in the frame 66 by suitable bearing means and has formed thereon a face portion 74 in which the pistons 58 are supported by ball and socket joints 76. A rotary piston pump of this general type is shown in U.S. Patent No. 1,137,283.

A ring-like port plate 78 surrounds shaft 60 and is maintained in sealing relation with face portion 74a of the cylinder barrel and a face portion 80 on the casing 42. The port plate 78 is equipped with axially extending ports (not shown) which are in register with ports (not shown) in the casing 42 and which are in turn in fluid communication with the hydrostatic motors 34 and 36 through conduit means within the casing 42. The cylinders 56 of rotating cylinder barrel 54 successively come into registry with the ports in the port plate 78 to discharge and receive hydraulic fluid to and from the motors 34 and 36 in a conventional manner.

The motors 34 and 36 are identical and are positioned within the housing 30 generally on opposite sides of the casing 42. Motor units of this general type are conventional as shown in, for example, U.S. Patent 1,137,283. The motors 34 and 36 like the pump 32, are of the axial piston type and may be either of a constant displacement or variable displacement type. If they are variable displacement, controls may be used to keep them at equal displacement when they are associated with wheel drives as herein illustrated. Where it is contemplated that the hydrostatic transaxle unit is to be used in a unit using steering-by-driving, such as in a crawler track vehicle like a military tank, then these motors should be of the variable displacement type with independent displacement controls.

The motor 34 is supported by appropriate means within the housing 30. It comprises a stationary head 81 and a cylinder barrel 82 which is rotatably mounted in the head 81. The cylinder barrel 82 may be formed with a recess 84 in which suitable bearing means 86 are positioned to provide means for rotatably supporting the cylinder barrel 82 on a shaft 88 which is supported in the head 81. A ring-like port plate 90 in which are formed ports 92 is positioned in a recess 94 in the head 81 between the outer end of the cylinder barrel 82 and the bottom of the recess 94. The cylinder barrel 82 has an annular series of longitudinally extending cylinders 96 formed therein for receiving a plurality of pistons 98 which are adapted to reciprocate in the cylinders 96. The open outer ends 97 of the cylinders are adapted to succesively communicate with the ports 92 as the cylinder barrel 82 rotates. Suitable conduit means (not shown) are provided to establish fluid communication between the pump 32 and the cylinders 96 through the ports 92 of the port plate 90. Suitable end bearing means 100 may be provided between the end of the cylinder barrel 82 and the port plate 90 to further accommodate the rotation of the cylinder barrel 82 in the head 81 with the minimum of frictional losses. Piston rods 102 are connected to the piston 98. Ball and socket joints 104 support the other end of the piston rods 102 in force plate 38 which is rotatably mounted in casing 42 by suitable bearing means, such as ball bearings 106, the force plate 38 being rotatably driven by the reciprocating motion of the pistons 98. A coupling member 108 also connects in constrained relation the cylinder barrel 82 with the force plate 38 by means of universal joint connections at each end thereof for rotating the cylinder barrel 82 in phased relation with the force plate 38.

The motor unit 36 is identical to the motor unit 34 and operates in the same manner. The identical parts thereof are numbered with the same reference characters as applied to the parts of motor 34 and include a suffix *a*. The motor unit 36 is drivingly connected to the force plate 40 in the same manner as the motor unit 34 is connected to the force plate 38. Consequently, the description of motor unit 36 and its connection to the force plate 40 need not be repeated.

The force plate 40 is rotatably mounted in casing 42 by ball bearing means 106a to be rotatably driven by the piston members of motor unit 36. The force plates 38 and 40 are mounted to rotate in substantially parallel planes disposed normal to the axis of rotation of the axle drive shafts 44 and 46.

Figure 3:
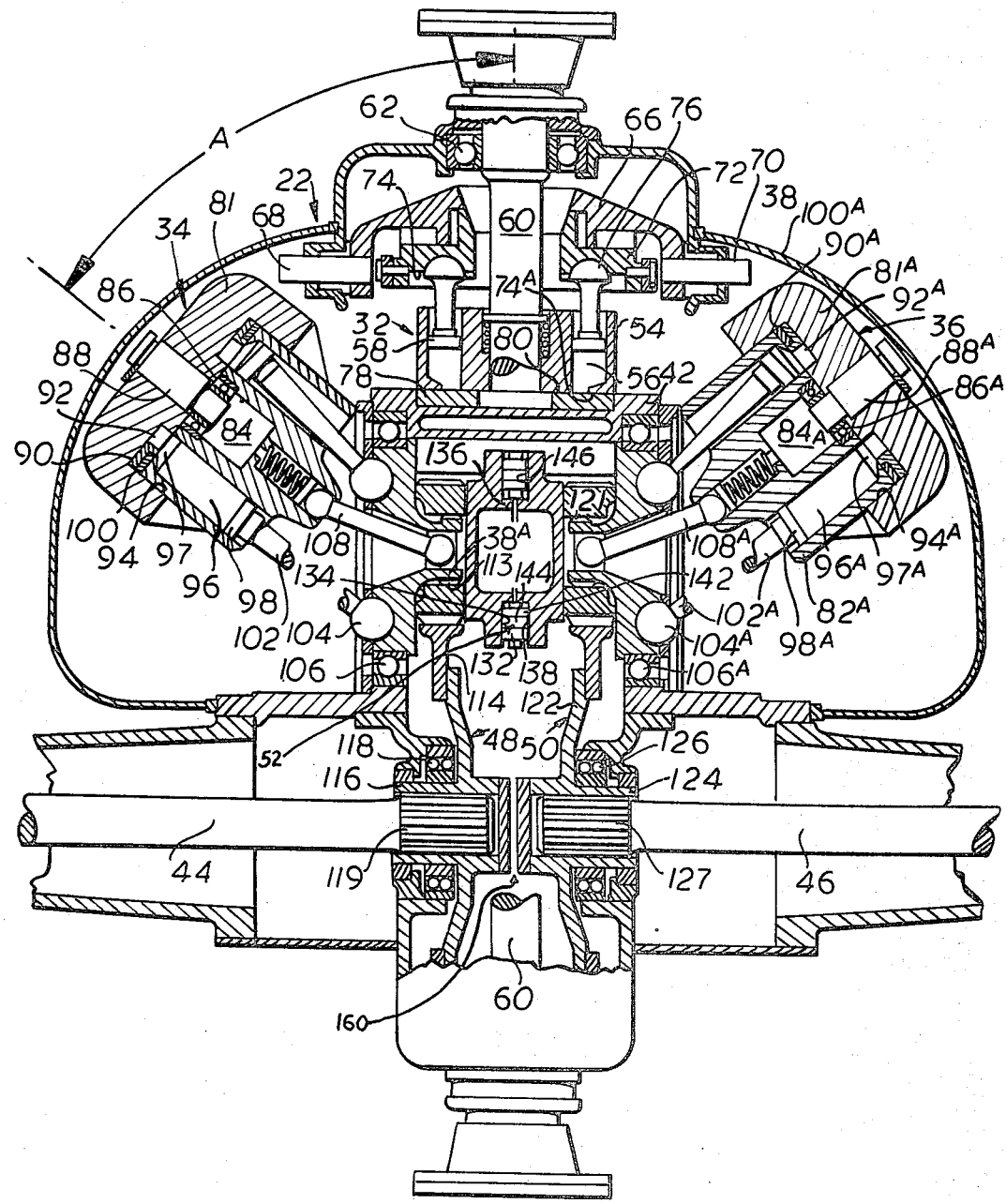
FIGURE 3 is an enlarged plan view in section showing in greater detail the hydrostatic transaxle unit of FIGURE 2.

As will be observed from FIGURE 3, the motor units 34 and 36 are symmetrically disposed with respect to the axis of the pump drive shaft 60. The motor unit 34 is disposed at a predetermined acute angle A with respect to the force plate 38. Motor unit 36 is disposed at the same angle A with respect to force plate 40.

Countershaft gear set 48 transmits the drive from the motor 34 to the axle drive shaft 44. It includes a spur pinion 112 and a gear 114 which is larger than, meshes with and is driven by the pinion 112. The pinion 112 is driven by an appropriate spline connection 113 secured to an axially extending boss 38a which is formed on the force plate 38 and extends coaxially therewith. Thus, the pinion 112 rotates with the force plate 38. The gear 114 may be formed with a hub portion 116 with which ball bearing means 118 are associated to locate the gears 114 and 122 in a portion of the casing 42 in conjunction with bearing means 160. The axle drive shaft 44 is secured in the hub 116 of gear 114 by a spline connection 119 and, thus, the shaft 44 and wheels 14 connected to shaft 44 are driven when the gear 114 is driven.

The countershaft gear set 50 is similar to gear set 48 and includes a spur pinion 120 which is the same size as pinion 112 and a large gear 122 which is the same size as gear 114. The gear 122 meshes with and is driven by pinion 120. The pinion 120 is secured by an appropriate spline connection 121 to an axially extending boss 40a which is formed on the force plate 40 and extends coaxially therewith. Thus, the pinion 120 rotates with force plate 40. The gear 122 may be formed with a hub portion 124 with which ball bearing means 126 are associated to rotatably journal the gear 122 in a portion of the casing 42. The axle drive shaft 46 is secured in the hub 124 of the gear 122 by a spline connection 127 and, thus, the shaft 46 and wheels 16 connected to shaft 46 are driven when the gear 122 is driven.

The thrust bearing means 52 for allowing differential action of the motor units 34 and 36 includes a thrust plate 128 associated with motor unit 34, a thrust plate 130 associated with motor unit 36 and bearing means 132 disposed between the thrust plates 128 and 130. The thrust plate 128 is a hub-like unit which is attached to pinion 112 to rotate therewith in a plane parallel thereto. A flat annular bearing race 134 is formed on the thrust plate 128 in a plane parallel to the pinion gear 112. An axially extending annular shoulder 136 is formed on the thrust plate 128 at the inner edge of bearing race 134 for reasons which will become more apparent.

The thrust plate 130 is similar to the thrust plate 128, and is attached to the pinion 120 in a manner similar to the attachment of thrust plate 128 to pinion 112. A flat bearing race 138 is formed on thrust plate 130 in a plane parallel to bearing race 134 and in opposing relation thereto. An axially extending annular shoulder 140 is formed on the thrust plate 130 at the inner edge of bearing race 138 in opposing relation to shoulder 136.

The bearing means 132 comprises an annular cage member 142 in which are disposed a plurality of bearing members 144 shown as being in the form of roller bearings. It is contemplated that the bearing members 144 also could be ball bearings. The roller bearing members 144 are supported in the cage member 142 by suitable means and are circumferentially spaced about the cage member. The roller bearing members may be disposed along radially extending axes extending from the center line of the thrust plates 128 and 130. The opposing annular shoulders 136 and 140 define an annular opening 146 between the thrust plates 128 and 130 in which the bearing means 132 is disposed. The roller bearing members 144 are of such a diameter that in the assembly these bearing members are in contact with both of the bearing races 134 and 138. The thrust bearing means 52 rotates as a unit with the force plates 38 and 40 and the pinions 112 and 120 as they are driven by the two motors.

In this arrangement, the transverse thrust of the motor 34 is resisted, through the bearing means 132 by the transverse thrust of the motor 36. The bearing means 132 allows for differential action such as turning a corner thrust plate 128 may rotate faster than thrust plate 130. This means for absorbing the opposing transverse thrusts of the two motor units 34 and 36 is one of the important features of this invention. It is effective to minimize frictional losses which are considerable with the conventional thrust bearing arrangements to the housing for it will be observed that in normal operation the motors 34 and 36 will rotate at essentially the same speed and thus there is little or no relative rotation between thrust plates 128 and 130.

FIGURE 5 is a force diagram illustrating the forces resulting from the piston thrust of the motors 34 and 36. $P_l$ and $P_r$ represent the thrust of the pistons of the left and right motors 34 and 36 respectively. $P_a$ and $P_c$ represent the axial thrust component and the radial thrust component respectively of motor 34. $P_b$ and $P_d$ represent the axial thrust component and the radial thrust component respectively of motor 36. As previously noted, each of the cylinder barrels of motors 34 and 36 are positioned at an acute angle A with the axis of their respective force plates 38 and 40 which gives rise to the axial and radial thrust components exerted by the pistons of each motor on their respective force plates. The piston thrust $P_l$ of the left motor 34 and the right motor 36 $P_r$ as viewed in FIGURE 3 are equal because they result from the same pressure source, namely, the pump 32. In the embodiment disclosed herein, the angle of application A of both cylinder barrels 82 of the motors is equal. If the motors utilized are variable displacement motor units, these angles of application would be kept equal by conventional displacement controls associated with the motors unless steering-by-driving is desired in which case independent controls are necessary. With the angles of application A being equal, the radial components $P_c$ and $P_d$ of motors 34 and 36 respectively are equal, and the axial components $P_a$ and $P_b$ of motors 34 and 36 respectively are equal and opposite. The radial components $P_c$ and $P_d$ generate the torque applied to the force plates 38 and 40 and transferred through the countershaft gears 114 and 122 to the axle drive shafts 44 and 46 and their associated wheel assemblies 14 and 16 respectively. The separating force (S.F.) of gears 112 and 114 is proportional to the torque and radial component $P_c$ and acts in the opposite direction thus affecting the radial bearing load (R) on bearing means 106. The load (R) can be minimized by properly locating the force plate and pinion thus minimizing the frictional power loss due to the load (R).

The separating force (S.F.) of gears 120 and 122 is proportional to the torque and radial component $P_d$ and acts in the opposite direction, identical to gears 112 and 114, thus minimizing radial bearing load (R) on bearing means 106a. Thus the radial bearing load on each of the bearing means 106 and 106a is minimized by proper relative location of the thrust plates, pinion and bearing and is less than the conventional motor without countershaft gearing.

The axial components $P_a$ and $P_b$ of the piston thrust of the two motors 34 and 36 accomplish no useful work and in conventional hydrostatic motors is converted into friction horsepower through a thrust bearing supported by a stationary housing. This is a great loss in conventional units and contributes to their low efficiency particularly at small angles of Application A. In the transaxle disclosed herein, the motors 34 and 36 are turning coaxially disposed axle drive shafts 44 and 46 and their associated wheel asemblies 14 and 16, so the motors are rotating at substantially the same speeds. Thus, even though the thrust bearing is loaded it has essentially no friction power loss. One slight exception to this would be in the case of differential action where one wheel assembly is caused to turn faster than the other. Even in that case, however, the relative speeds during such differential action is much less than in thrust bearings of conventional units and does not substantially change the "low friction" characteristics of this unit.

While the operation of the hydrostatic transaxle unit 22 is no doubt quite apparent from the above description, a brief summary of the operation will now be given. The pump 32 as here shown takes its drive from the drive shaft 60 which in turn is driven by the engine through shaft 24. The speed of the vehicle 10 is controlled by varying the displacement of the pump 32. This is done by tilting the head 66 as desired on the mounting trunnions 68 and 70 by conventional control means (not shown). Hydraulic fluid is alternately drawn into the cylinders 56 and discharged therefrom in quantities depending on the position of the head 66. Discharged pressure fluid is sent through passages (not shown) in the casing 42 to connecting fluid passages (not shown) in the stationary heads 81 and 81a and into successive cylinders 96 and 96a of motor units 34 and 36 to thereby reciprocate the piston members of each of those motor units. This action of the pistons is effective to rotate the force plates 38 and 40 and the pinions 112 and 120 connected thereto. This rotary motion is transferred to gears 114 and 122 respectively and to the axle drive shafts 44 and 46 and the wheel asemblies connected thereto. The two motor units 34 and 36 independently drive the wheel assemblies 14 and 16 respectively. Because the cylinder barrels of motor units 34 and 36 are positioned at an angle A with their associated force plates, the pistons exert a thrust which have both an axial and a radial component. Orientation of the motor 34 including thrust plate 128 connected to pinion 112 and motor 36 including thrust plate 130 connected to pinion 120 and bearing means 132 positioned between the two opposing thrust plates cause the opposing axial thrusts from the two motor units to counteract and rotate as a unit with the drive from each of the motor units transmitted to its drive shafts. This considerably minimizes the frictional losses common to conventional thrust bearing arrangements. Even though this thrust bearing is loaded, it has essentially little or no friction power loss because there is little or no relative motion.

As previously mentioned, the hydrostatic transaxle unit can also be used in vehicles where steering by driving is desired such as in a track type vehicle. In such usage, of course, the motor units would be of a variable displacement type in order to vary the speed of the axle drive shafts. While the axial thrust components of the motor units would be unequal in such vehicles whenever the speed of one track is varied relative to the speed of the other, the frictional losses would still be considerably lower with the type of thrust bearing means disclosed herein as compared with conventional thrust bearing arrangements.

Transaxle units of the type described herein may be used with tandem axles such as may be found, for example, on trucks and buses. Such an arrangement is illustrated in FIGURE 4. A unit 222 in all respects similar to unit 22 would be associated with wheel assemblies 214 and 216 disposed immediately rearwardly of wheel assemblies 14 and 16. A pump drive shaft 260 would form a straight-through extension of pump drive shaft 60 and be driven together therewith through coupling 200, and the drive shaft 260 would be drivingly connected to pump 232. Unit 222 would operate in the same manner as unit 22.

In summary, I have advantageously provided a low-friction hydrostatic transaxle unit for use in a motor vehicle which can replace the conventional transmission and differential. The unit may be conveniently mounted to or formed as the axle housing using a conventional drive line. A reduction in friction horsepower is achieved by back-to-back mounting of the motor components. The mounting means is particularly significant in minimizing the frictional power losses and the thrust bearing means allows for differential action.

What is claimed is:
1. In a vehicle hydrostatic transaxle the combination comprising:
   a hydraulic pump;
   a pair of fluid motors for driving the axle drive shafts of a vehicle, said motors being arranged to receive and be driven by hydraulic pressure fluid from said pump; and
   thrust bearing means disposed between and operatively associated with said fluid motors to transmit opposing transverse thrusts transmitted by said motors,
   said thrust bearing means includes two thrust plates respectively connected to said motors to be driven thereby, said thrust plates being disposed adjacent each other for rotation in substantially parallel planes and roller bearing means disposed between and in contact with said thrust plates.

2. The combination of claim 1 including
   countershaft gearing operatively associated with said fluid motors for transmitting a drive from said fluid motors to the axle drive shafts of a vehicle.

3. In a vehicle hydrostatic transaxle the combination comprising:
   a hydraulic pump;
   casing means;
   a pair of hydrostatic motors disposed on opposite sides of said casing means and adapted to receive hydraulic pressure from said pump and to transmit a drive to axle drive shaft means with which said motors are adapted to be operatively associated;
   force plate means operatively associated with each of said hydrostatic motors to be driven thereby;
   means for rotatably mounting said force plate means in said casing means; and
   thrust bearing means disposed between and operatively associated with said force plate means for transmitting the opposing axial thrusts applied to said force plate means by said motors.

4. The combination of claim 3 wherein
   said hydraulic pump is a variable displacement pump.

5. The combination of claim 3 wherein
   said hydrostatic motors are variable displacement motors.

6. The combination of claim 3 wherein
   each of said motors are of the axial piston type.

7. The combination of claim 3 wherein
   said thrust bearing means comprises common thrust bearing means for transmitting the opposing transverse thrusts of said motors while allowing differential action.

8. The combination of claim 3 wherein
   said thrust bearing means includes opposing thrust plates operatively associated with each of said force plate means and a roller bearing assembly disposed between and contacting both thrust plates, said thrust plates being rotatable with said force plate means.

9. The combination of claim 3 wherein
   said opposing thrust plates have formed thereon opposing axially extending annular shoulders to define a circumferentially extending opening between said thrust plates for supporting said roller bearing assembly.

10. The combination of claim 3 including
    countershaft gear sets operatively connected to each motor to transmit a drive from said motor to a vehicle axle drive shaft.

11. The combination of claim 10 wherein
    each said countershaft gear set includes first gear means connected to each of said force plate means for rotation therewith and in a plane parallel thereto, and second gear means in mesh with said first gear means and rotatably mounted in said casing means and adapted to have an axle drive shaft connected thereto, whereby the axle drive shaft is driven through said countershaft gear set.

12. The combination of claim 11 wherein
    the countershaft gear sets connected to each motor are independent of each other and are independently driven by their respective associated motors.

13. The combination of claim 3 wherein
    each of said motors are of the axial piston type and are each disposed at an angle with its associated force plate means, whereby the pistons of said motors impart a thrust to said force plate means having radially directed components of force in the same direction and axially directed components of force in opposite directions, and including
    a pinion gear connected to each of said force plate means and coaxially disposed with respect thereto to rotate in a plane parallel therewith; and
    said thrust bearing means include a single roller bearing assembly operatively associated with and common to each of said motors to take the opposing transverse thrust components applied by said motors.

14. The combination of claim 13 wherein
    said thrust bearing means further includes a thrust plate connected at each of said pinion gears to rotate therewith,
    said roller bearing assembly being disposed between and in contact with each of said thrust plates.

15. In a vehicle hydrostatic transaxle the combination comprising:
    a first variable displacement fluid pump having a forwardly and rearwardly extending pump drive shaft;
    casing means;
    a pair of hydrostatic motors for transmitting a drive to a pair of axle drive shafts, said motors being disposed on each side of said casing means and arranged to receive fluid pressure from said pump;
    a pair of coaxially disposed axle drive shafts adapted to have wheel assemblies connected thereto;
    a pair of force plates rotatably mounted in said casing means and operatively associated with said hydrostatic motors to be driven thereby;
    a driving gear connected to and coaxially disposed with each of said force plates to be driven therewith by said hydrostatic motors;
    thrust bearing means disposed between said driving gears and operatively associated therewith to receive oppositely directed axial thrusts of said hydrostatic motors, said thrust bearing means being common to both motors and adapted to rotate with said force plates and driving gears while allowing differential action;
    a driven gear operatively associated with each of said axle drive shafts and operatively associated with said driving gears to take a drive therefrom to transmit the drive to said axle drive shafts.

16. The combination of claim 15 wherein
    said variable displacement pump is adapted to be driven from the engine drive shaft of the vehicle with which the transaxle unit is associated.

17. The combination of claim 15 including
    a pump drive shaft for driving said first pump, said pump drive shaft being adapted to be driven from the engine drive shaft with which the transaxle unit is associated;
    a second pair of coaxially disposed axle drive shafts spaced rearwardly from said first pair of axle drive shafts to comprise a tandem axle unit;
    a second pair of hydrostatic motors for driving said second pair of axle drive shafts;
    a second variable displacement fluid pump having a second pump drive shaft for supplying fluid pressure to said second pair of motors;
    said second pump drive shaft including a longitudinally extending portion, and
    means drivingly connecting said longitudinally extending portion to said rearwardly extending pump drive shaft of said first variable displacement pump.

References Cited

UNITED STATES PATENTS

| | | | |
|---|---|---|---|
| 1,227,055 | 5/1917 | Kellogg | 60—53 |
| 1,263,180 | 4/1918 | Williams | 60—53 |
| 3,052,098 | 9/1962 | Ebert | 60—53 |
| 3,213,620 | 10/1965 | Swift et al. | 60—53 |

BENJAMIN HERSH, *Primary Examiner.*

L. D. MORRIS, JR., *Assistant Examiner.*

U.S. Cl. X.R.

60—53; 180—66